April 17, 1945. W. A. BILLINGHURST 2,373,992
SELF-FEEDING POWER DRIVEN SCREW DRIVER OR LIKE TOOL
Filed June 18, 1943. 3 Sheets-Sheet 1

INVENTOR.
Wilfred A. Billinghurst,
BY George D. Richards,
Attorney

April 17, 1945. W. A. BILLINGHURST 2,373,992
SELF-FEEDING POWER DRIVEN SCREW DRIVER OR LIKE TOOL
Filed June 18, 1943 3 Sheets-Sheet 2
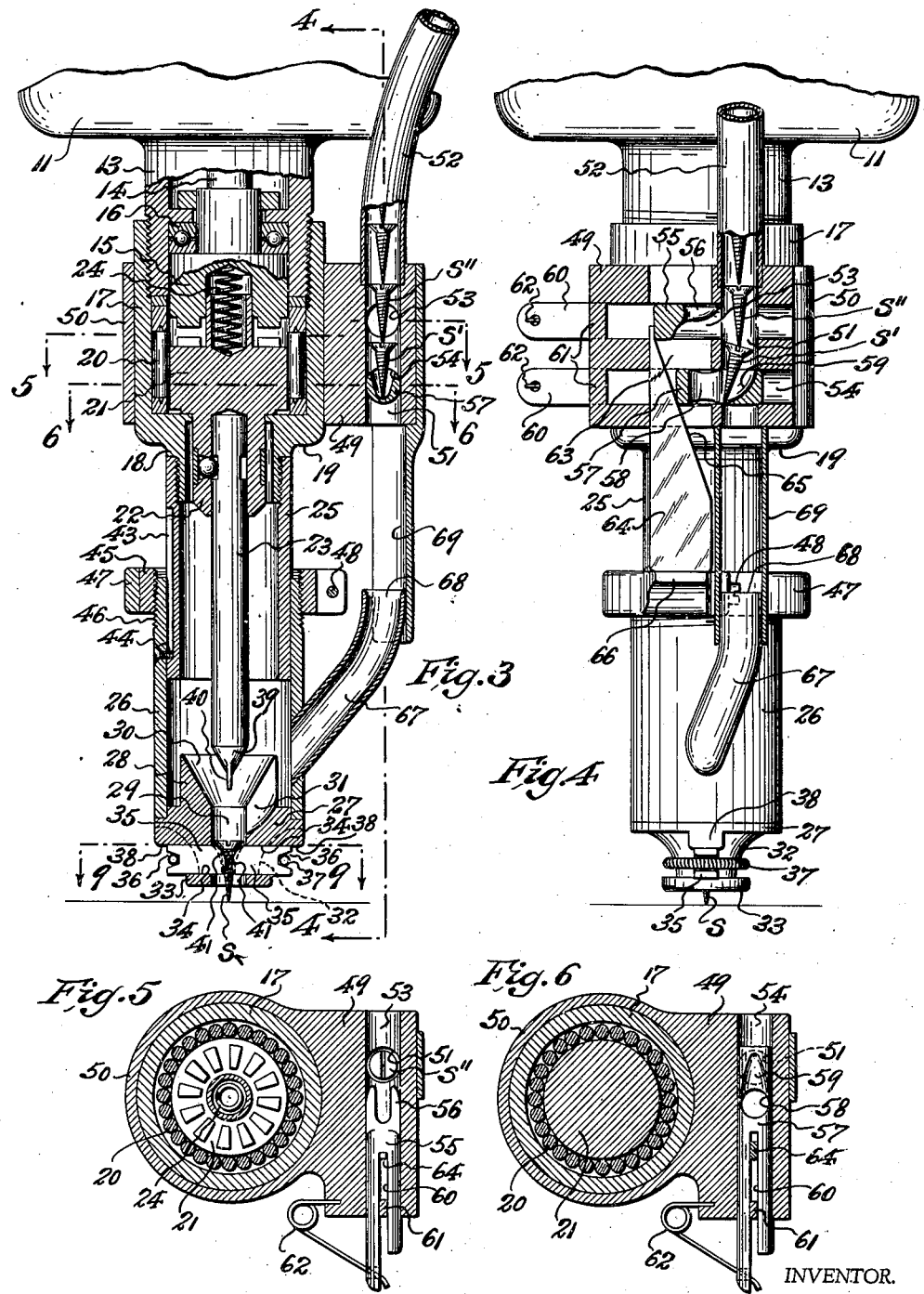
INVENTOR.
BY Wilfred A. Billinghurst,
George D. Richards
Attorney April 17, 1945. W. A. BILLINGHURST 2,373,992
SELF-FEEDING POWER DRIVEN SCREW DRIVER OR LIKE TOOL
Filed June 18, 1943 3 Sheets—Sheet 3
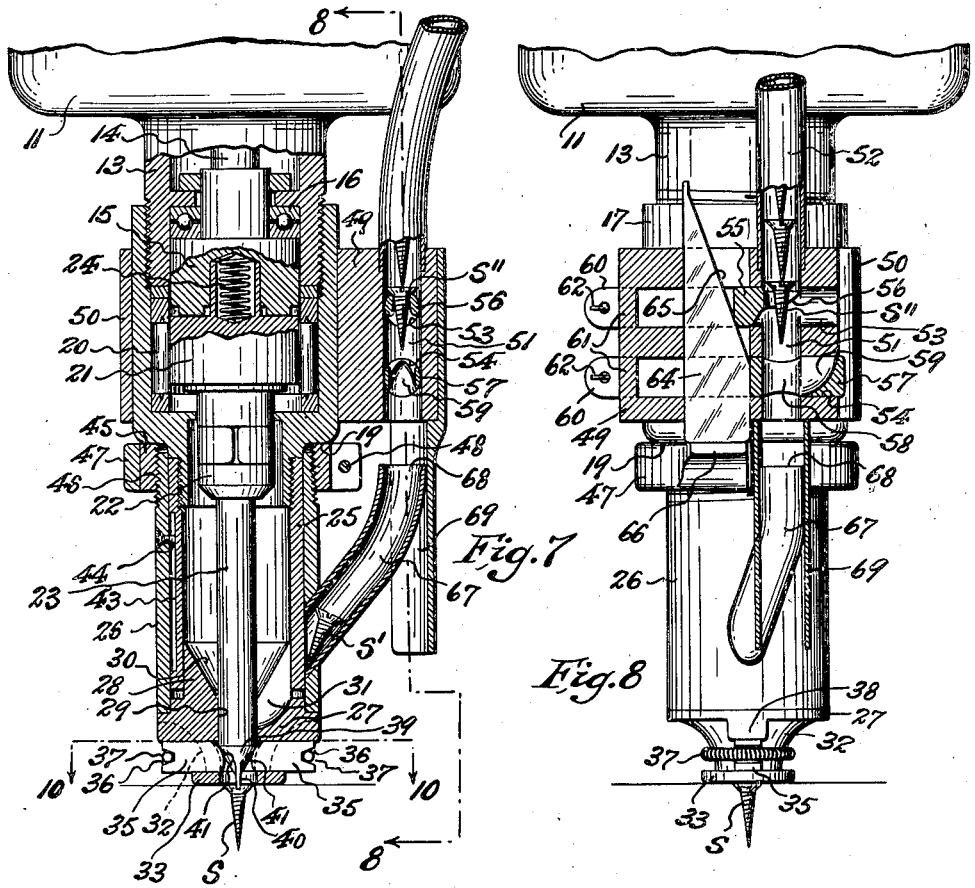
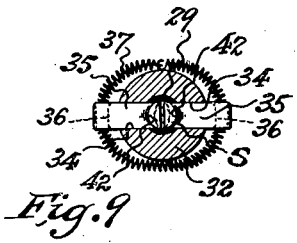
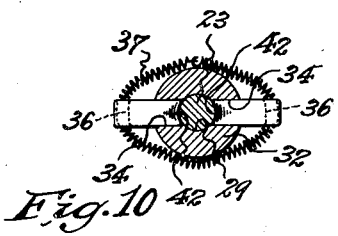
INVENTOR.
Wilfred A. Billinghurst,
BY George S. Richards
Attorney Patented Apr. 17, 1945

2,373,992

UNITED STATES PATENT OFFICE 2,373,992

SELF-FEEDING POWER-DRIVEN SCREW DRIVER OR LIKE TOOL

Wilfred A. Billinghurst, Elizabeth, N. J., assignor of one-half to Charles Handler, Newark, N. J.

Application June 18, 1943, Serial No. 491,318

5 Claims. (Cl. 144—32)

This invention relates to improvements in portable self-feeding power driven screw-drivers and similar tools; and the invention has reference, more particularly, to a novel construction of portable power driven screw-driver or other tool having improved means for automatically controlling the successive delivery of screws or other fastener elements thereto, subject to being driven thereby.

Th invention has for an object to provide a compact and simplified construction and relation of mechanisms for automatically delivering screws or other fastener elements to and for driving engagement by a power driven screw driver or other tool.

Another object of the invention is to provide a reciprocable means, disposed in axially aligned relation to a power driven screw-driver or other tool, which is adapted to receive, position and hold a screw or other fastener element ready for and during operative driving engagement thereof by the tool; and reciprocable means having an adjustable stop means for modifying its operative stroke relative to the screw-driver or other tool, whereby to optionally permit either flush or countersunk setting of the screw or other fastener when driven by the tool.

The invention has for a further object to provide a reciprocable means adapted to receive, position and hold a screw or other fastener element ready for and during operative driving engagement thereof by the tool, including a novel holding chuck having opposed movable jaws adapted to align the fastener to be driven in opposition to the tool, said jaws being supported for yieldable rectilinear movement transverse to the axis of the aligned fastener and tool, and having fastener engaging ends which are convex in vertical plane and concave in transverse plane, whereby to exert constant, equalized but yieldable holding pressure upon opposite sides of the fastener and at right angles to the vertical axis thereof, so that canting or tipping of the fastener, especially during initial driven movement thereof, is prevented; said chuck means also including fender means at its free end which, together with the rectilinear movement of the jaws, prevents the latter from contacting and gouging or otherwise marring the surface of the material into which the fastener is driven by the tool.

A further object of the invention is to provide a novel means for successively and automatically feeding fasteners to the chuck for the reciprocable means, including a novel construction of fastener detent means and actuating means therefor which is operated by the reciprocable means, in such manner as to properly time the successive release of fasteners from a supply thereof for delivery to the holding chuck of the reciprocable means, after completion of each operative reciprocation of the latter, and the attendant driving of a preceding fastener by the tool.

Other objects of this invention, not at this time more particularly enumerated, will be understood from the following detailed description of the same.

An illustrative embodiment of this invention, in the form of a portable self-feeding power driven screw driver, is shown in the accompanying drawings, in which:

Fig. 1 is a side elevational view and Fig. 2 is a front elevational view of a self-feeding power driven screw-driver according to this invention.

Fig. 3 is a fragmentary vertical longitudinal sectional view, with the reciprocable means and its fastener holding chuck as initially disposed ready to present a screw for engagement and driving by the power driven screw driver, said view being drawn on an enlarged scale; Fig. 4 is a vertical longitudinal sectional view, taken on line 4—4 in Fig. 3; Fig. 5 is a horizontal sectional view, taken on line 5—5 in Fig. 3; and Fig. 6 is another horizontal sectional view, taken on line 6—6 in Fig. 3.

Fig. 7 is a view similar to that of Fig. 3, but showing the reciprocable means operated to engage the screw, held by its chuck, with the power driven screw driver, the latter having completed the screw driving operation; and Fig. 8 is a vertical longitudinal sectional view, taken on line 8—8 in Fig. 7.

Fig. 9 is a horizontal sectional view, taken on line 9—9 in Fig. 3; and Fig. 10 is a similar horizontal sectional view, taken on line 10—10 in Fig. 7.

Similar characters of reference are employed in the above described views, to indicate corresponding parts.

Figure 1:
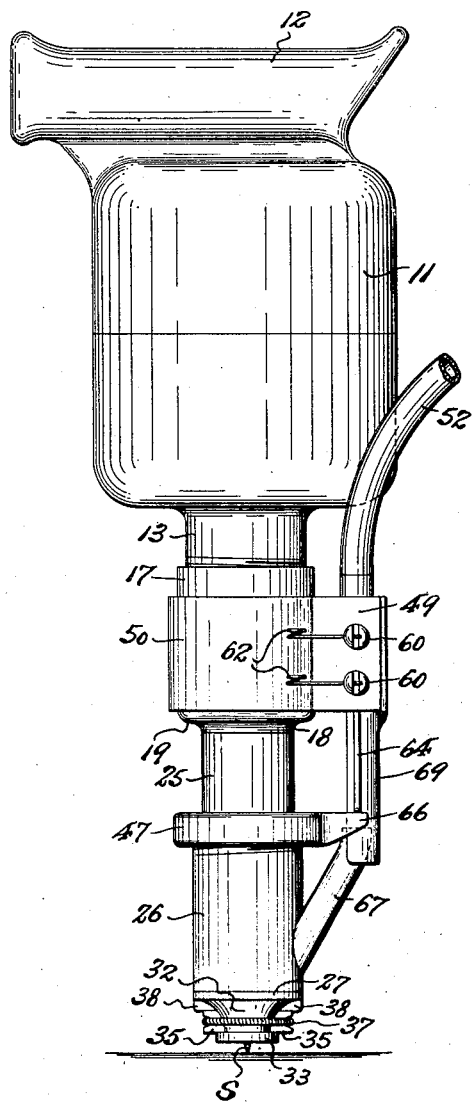
Figure 2:
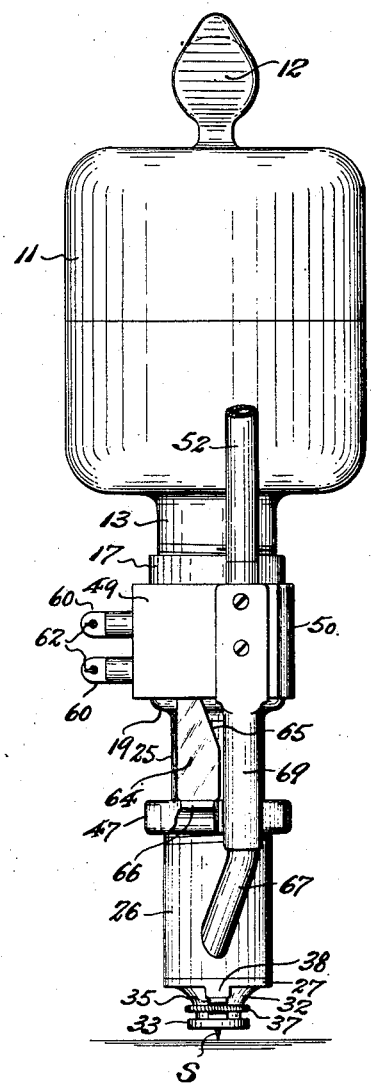

Referring to the drawings, the reference character 11 indicates the motor of the portable tool, the latter being illustratively shown in the form of a screw-driver tool. At its upper end the casing of the motor 11 is provided with a suitably shaped and disposed hand-grip member 12 adapted to be grasped by the operator, when using the tool. At its lower end the casing of the motor 11 is provided with dependent bearing neck 13, into which extends a motor driven shaft 14. Affixed to the end of said shaft 14 is an axially stationary clutch-head 15, which is journaled in suitable bearing means, preferably including a thrust bearing 16 of anti-friction type. Threaded onto said bearing neck 13 is a clutch housing 17, the same having an axial extension 18 of reduced diameter, adapted to provide an external stop shoulder 19 at its juncture with said housing 17. Supported within said housing 17, and preferably journaled in bearing means 20 of the anti-friction roller type, is an axially movable clutch-head 21 for opposition to and cooperation with said axially stationary clutch-head 15. At its lower end said clutch-head 21 is provided with a suitable coupling connection 22, to detachably receive and suitably couple to the clutch mechanism a screw-driver member 23. Said clutch-heads 15 and 21 are normally and yieldably held in separated or disengaged relation by a compression spring 24 which is suitably interposed therebetween.

Secured to said extension 18 of the clutch housing 17 so as to depend therefrom, concentric to the axis of and in axial alignment with the screw-driver member 23, is a stationary guide sleeve 25. Slidably mounted on said guide sleeve 25 is an external reciprocable member or sleeve 26. Affixed to the lower free end of said reciprocable sleeve 26 is a fastener or screw receiving and holding chuck. Said chuck comprises a main body 27 having an upper or inner end portion 28 of reduced diameter, and corresponding in diameter to the internal diameter of said guide sleeve 25, so as to be capable of telescopically entering into the latter at proper times. Said chuck body 27 is provided with an axial bore 29 of a diameter corresponding to the diameter of the screw-driver member 23; said bore being in axial alignment with said screw-driver member. The upper end of said bore 29 preferably terminates, within said upper or inner end portion 28 of the chuck body 27, in a flared mouth portion 30, and formed in said chuck body 27 and its said end portion 28 is a laterally open gateway 31, which extends angularly downward and inward so as to intersect said bore 29. Said chuck body 27, at its lower or outer end, is shaped to provide a neck-portion 32 of reduced diameter, and preferably of inverted conical shape. Said neck-portion 32 terminates in a preferably diametrically enlarged fender portion or foot piece 33. Extending diametrically through said neck-portion 32, above the fender portion or foot piece 33, and so as to diametrically intersect the bore 29, are opposed transverse ways 34. Slidably mounted in said ways 34, are a pair of opposed rectilinearly movable jaws 35, the inner ends of which enter said chuck body bore 29, while their outer ends project externally, respectively from opposite sides of said neck-portion 32. The outer extremities of said jaws are provided with transverse notches 36 to receive an annular tensionally constrictive coil spring means 37 which yieldably urges the jaws toward each other. Preferably the chuck body 27 is provided with external lug formations 38 to provide a generous area of support for the sliding movements thereof. At their inner ends, said jaws are shaped to grasp a screw or fastener element S disposed therebetween, while at the same time to easily respond to the thrust of a conical cam section 39 with which the screw-driver member 23 is provided immediately above and adjacent to its blade 40. Preferably the inner ends of the jaws 35 are each shaped to be convex in vertical plane, as at 41 in Figs. 3 and 7, and concave in transverse or horizontal plane, as at 42 in Figs. 9 and 10. Such horizontal concavity of the jaws assures a centering grip thereof upon the shank of a screw or other fastener element S disposed therebetween, while the vertical convexity of said jaws responds easily and uniformly to thrusts of the screw or fastener head and of the cam section 39 of the screw-driver member, so as to yield to passage of said parts downwardly therebetween during operation of the tool.

Cooperative means are provided for limiting the downward movement of said reciprocable sleeve 26 relative to the guide sleeve 25, whereby to predetermine the lowered normal initial position of said sleeve and its screw or fastener holding chuck means relative to and in opposition to the screw-driven member 23 of the tool. An illustrative form of such means comprises a longitudinal spline 43 having a limiting lower end formed in the exterior of the guide sleeve 25, and a stop stud 44 carried by said reciprocable sleeve 26 to enter said spline.

Said reciprocable sleeve 26 is provided at its upper end with an adjustable stop means for cooperation with the stop shoulder 19 of the housing 17, whereby to varyingly limit the operative upward stroke of said reciprocable sleeve 26, and its screw or fastener holding chuck means, relative to the screw-driver member 23 of the tool. An illustrative form of said stop means comprises an internally screw-threaded collar 45, split so as to be capable of lateral contraction. Said collar is screwed onto the externally screw-threaded upper end portion 46 of said reciprocable sleeve, so as to be longitudinally adjustable thereon. Surrounding said collar 45 is a discontinuous clamp ring 47, adapted to be constrictively tightened about said collar by a clamp screw 48 which is engaged with its meeting ends. To adjust the collar, the clamp ring is loosened to expand said collar, which may then be turned up or down on the reciprocable sleeve 26. After desired adjustment of the collar, the clamp ring 47 is tightened to constrict the collar, and thus frictionally bind the same to the reciprocable sleeve 26 against accidental displacement from its adjusted relation thereto.

The means for automatically and successively feeding screws or similar fasteners to the holding chuck means of the reciprocable sleeve 26 comprises escapement detent means and actuating means therefor which is operated by the upstroke of said reciprocable sleeve 26, and comprises a housing block 49 formed with an annular supporting band 50 engaged upon and around the clutch housing 17 of the tool, whereby to laterally offset the housing block 49 therefrom. Said housing block 49 is provided with a perpendicular bore 51 which provides a passage for the descent of screws or like fasteners therethrough. A train or column of said screws or fasteners are supplied by gravity through a flexible conduit 52 which is suitably joined to the housing block 49 in communication with the upper end of said bore or passage 51. Said conduit 52 leads from a supply magazine (not shown) which is equipped with means for successively delivering the screws or fasteners thereinto, pointed end foremost, whereby to form the supply train or column thereof. Also formed in said housing block 49 is an upper horizontal slideway passage 53 disposed at right angles to and so as to intersect said perpendicular screw or fastener passage 51, and spaced below said upper slideway passage is a second or lower horizontal slideway passage 54 also disposed at right angles to and so as to intersect said perpendicular screw or fastener passage 51. Slidably mounted in said upper slideway passage 53 is a detent bolt 55. This detent bolt 55 is provided at its forward end with a bifurcate portion or fork 56, the slot of which approximates in width the shank diameter of a screw or fastener, whereby when operatively projected across the screw or fastener passage 51, the fork 56 may engage beneath and support the head of a screw or fastener so as to arrestingly suspend the same against downward movement through said passage 51, and thus also sustain the column of screws or fasteners in the conduit 52 against downward movement. Slidably mounted in the lower slideway passage 54 is a detent bolt 57, which is provided at its forward end portion with a drop opening 58, and forward thereof with a downwardly and rearwardly inclined pocket 59, the mouth of which communicates with said drop opening 58. Each said detent bolt 55 and 57 is provided with a slotted tail portion 60 which straddles a retaining web 61 that vertically and diametrically intersects the rearward end portion of each slideway passage 53 and 54, thus retaining said detent bolts against rotative displacement from their operative disposition in the respective slideway passages. The tail portions 60 of the detent bolts each project rearwardly and exteriorly of the housing block 49, and are each engaged by the tensional arm of retractor spring means 62, the anchoring arms of which are fixed in the body of said housing block 49. Said housing block 49 is further provided with a perpendicular guideway 63, which is spaced rearwardly behind the screw or fastener passage 51, and in alignment with the slots of the tail portions 60 of the respective detent bolts 55 and 57. Vertically reciprocable through said guideway 63, and the aligned slots of the detent bolt tail portions 60, is a cam plate 64 having a downwardly and forwardly inclined cam edge 65 adapted to engage the bodies of said detent bolts 55 and 57 at the inner terminations of the slots of their tail portions. The clamp ring 47, which forms a part of the stop means for determining the limit of the upward operative stroke of the reciprocable sleeve 26, is provided with an outwardly projecting lift lug 66 which engages and supports the lower end of said cam plate 64. The retractor spring means 62 yieldably retract the detent bolts 55 and 57, so as to retain the same in operative engagement with the cam edge 65 of said cam plate.

Connected with said reciprocable sleeve 26 to communicate with the interior thereof, at a point adjacent to and in substantial alignment with the gateway 31 of the screw or fastener receiving and holding chuck, is screw or fastener guide tube 67, which projects exteriorly from the reciprocable sleeve 26 in an upwardly inclined direction, whereby to dispose its exterior mouth portion 68 in alignment with but spaced from the lower outlet end of the screw or fastener passage 51. Secured to the housing block 49 to depend therefrom, and so as to extend between said screw or fastener passage 51 and the mouth end of said guide tube 67, is a channeled guard plate 69, to which said mouth end of the guide tube 67 is slidably related for movement toward and from the discharge end of said screw or fastener passage 51.

In normal initial position, preparatory to operation of the tool, the reciprocable sleeve 26 occupies its lowered or downwardly slid position on the supporting guide sleeve 25, thus spacing the screw or fastener holding chuck of said reciprocable sleeve 26 below the blade 40 of the screw driver member 23, and holding a screw S, previously delivered thereto, in aligned relation to the screw driver member ready to be engaged by the blade 40 of the latter. At the time the reciprocable sleeve 26 is thus initially disposed, the cam plate 64 also occupies a normal initial lowered position, so that the detent bolts 55 and 57 occupy a normal initial retracted position. When the detent bolt 57 is thus retracted, its drop opening 58 is withdrawn out of alignment with the screw or fastener passage 51, but its pocket 59 is disposed in alignment with the latter passage, so that a screw S' stands point down therein in slightly inclined disposition toward the drop opening 58 (see Fig. 4). When the detent bolt 55 is thus retracted, its fork 56 is also withdrawn out of alignment with the screw or fastener passage 51, so that a screw S'', and screws thereabove, are supported by the detained screw S' (see Fig. 4).

During the immediately above described normal initial condition of the tool, the driven clutch head 21 is released or separated from the driver clutch head 15 by the action of the interposed spring means 24, and consequently, although the driver clutch head 15 may be continuously driven by the motor of the tool, the driven clutch head 21, and consequently the screw-driver member 23, both stand idle.

To operate the tool, the operator first aligns the projecting end of the screw S with the point of the material into which it is desired to be driven, and then pushes down upon the tool, which, in effect, slides upward the reciprocable sleeve 26 on the guide sleeve 25. The first stage of such relative upward movement of said reciprocable sleeve 26 carries the chuck supported screw S into engagement with the screw-driver member 23, and thus causes an initial upward relative movement of the latter, whereby to bring the driven clutch head 21 into engagement with the rotating driver clutch head 15, so that rotation of the screw-driver member is initiated. When the screw-driver member is thus rotated, its blade 40 finds and enters the head slot of the screw S, and driving of the latter begins and continues as the reciprocable sleeve 26 continues its relative upward movement, with the consequence that the rotated screw S is caused to pass downwardly between the chuck jaws 35, the latter yielding by rectilinear outward movement both to such passage, and to that of the screw-driver member 23. If the stop means 45—47 is adjusted on the reciprocable sleeve to limit the relative movements of the latter and the screw-driver member to an extent sufficient to attain flush setting of the screw S, the driving stroke of the screw-driver member will terminate when such setting of the screw S is attained. The fender portion 32 of the chuck spaces the chuck jaws 35 away from the surface of the material into which the screw S is driven, and since the movement of said jaws is rectilinear and parallel to such surface, rather than of a swinging or pivotal character, all risk of gouging or otherwise marring such surface is effectively avoided.

It may be desired to drive the screw S in such manner as to countersink its head in the material into which it is entered. This may be attained by adjustably lowering the stop means 45—47 on the reciprocable sleeve 26 so as to increase the amount of its upward movement before arrested by abutment against the stop shoulder 19, thus in effect lengthening or increasing the relative downward extent of the operative stroke of the screw-driver member 23, so as to permit prolonged driving of the screw S with desired countersinking effect.

As the reciprocable sleeve 26 rises on the guide sleeve 25 the cam plate 64 is engaged by the lift lug 66, and is caused to move upwardly therewith, whereby the detent bolts 55 and 57 are simultaneously slid forward by the thrust of the cam edge 65. By the time the upward movement of the reciprocable sleeve 26 is completed, the detent bolts 55 and 57 complete their operative forward strokes under the cam thrust. As the detent bolt 57 completes its forward stroke, the drop opening 58 reaches an aligned relation to the screw or fastener passage 51, so that the screw S' is released from the pocket 59 and caused to drop downward through the drop opening 58, and into the guide tube 67, through which it descends. In the meantime, however, the detent bolt 55 has also completed its forward stroke, whereby its fork 56 straddles the shank of the screw S'', so as to suspend the latter by its head, and thus arrest any downward movement thereof, as well as downward movement of the column of screws standing above the same in the conduit 52. By the time the screw S' is released, the gateway 31 of the chuck means carried by the reciprocable sleeve 26 has been moved into the lower open end of the guide sleeve 25 and behind the wall thereof, thus closing said gateway, and thereby exluding the dropped screw S' from entrance into the chuck, while the screw-driver member 23 is operating upon the previously delivered screw S.

Upon completion of the driving and setting of the screw S, the operator lifts the tool, which, in effect, slides downward the reciprocable sleeve 26, and thereby effects upward relative withdrawal of the screw-driver member 23 back to normal initial position, and eventual release of the clutch mechanism by which the latter is driven. At the same time, the guide sleeve 25 is withdrawn from covering relation to the gateway 31, so that the screw S', which has been retained in the guide tube 67, may pass therefrom through said gateway and into the clutch means, ready for a succeeding screw driving operation. In the meantime, the lowering of the reciprocable sleeve 26 is accompanied by a descent of the cam plate 64, thus permitting the spring means 62 to retract the detent bolts 55 and 57 to normal initial positions. Upon return of said detent bolts to such normal initial positions, the screw S'' is released from the fork 56 of the detent bolt 55 so as to drop through the passage 51 into the pocket 59 of the detent bolt 57, to be there supported and detained, together with the column of screws thereabove, pending a repetition of the above described operation of the tool.

An incidental advantage of the novel construction, wherein the reciprocable sleeve 26 and guide sleeve 25 are telescopically related, is that the screw-driver member and the power transmission for actuating the same, is wholly enclosed within the sleeve interior at all times, and consequently is very efficiently guarded against injury, against access of dirt or other foreign material thereto with likelihood of impairment or obstruction of its operation.

It will also be seen than the construction is very compact; that the screw delivery means is arranged closely adjacent to the longitudinal axis of the tool, so that the balance thereof is such as to assure easy and efficient handling and operation of the tool in use.

While I have specifically described a construction of tool of the screw-driver type, it will be obvious that, so far as the fastener feed mechanism is concerned, its general principles and construction is equally well applicable to other types of fasteners and means for the driving thereof.

It will likewise be understood that some changes may be made in the constructions shown in the drawings and above described without departing from the scope of this invention as defined by the following claims. It is therefore intended that all matter contained in the above description or shown in the accompanying drawings shall be interpreted as illustrative and not in a limiting sense.

I claim:

1. In a tool of the class described, a fastener driving means and power actuated means for operating the same, means for housing said power actuated means, a guide sleeve dependent from said housing means concentric to the axis of said fastener driving means, a reciprocable sleeve slidable on said guide sleeve, a chuck carried by the lower end of said reciprocable sleeve to receive and hold a fastener in aligned opposition to said driving means, said chuck comprising a body having an axial bore adapted to pass a fastener and the driving means therethrough, opposed jaws slidably supported by said body for rectilinear movements transverse to the axis of said bore, the inner opposed ends of said jaws being adapted to enter said bore, the outer ends of said jaws projecting exteriorly of said body and being notched, an annular spring means encircling said body and engaging the notched outer ends of said jaws to exert yieldable inward thrust upon the latter, the lower free end portion of said body being formed to provide a fender portion between said jaws and the surface of material into which a fastener is driven by said driving means, said body having an inner end portion of reduced diameter adapted to enter said guide sleeve upon upward movement of said reciprocable sleeve, said inner end portion having a laterally open gateway leading to said body bore above said jaws, and externally projecting fastener guide tube carried by said reciprocable sleeve in alignment with said gateway, and means actuated by said reciprocable sleeve for delivering a fastener from a supply thereof through said guide tube and gateway into said body bore for engagement by said chuck jaws prior to each working stroke of said fastener driving means.

2. In a tool of the class described, a fastener driving means and power actuated means for operating the same, means for housing said power actuated means, a guide sleeve dependent from said housing means concentric to the axis of said fastener driving means, a reciprocable sleeve slidable on said guide sleeve, a chuck carried by the lower end of said reciprocable sleeve to receive and hold a fastener in aligned opposition to said driving means, and means actuated by said reciprocable sleeve for delivering a fastener from a supply thereof to said chuck prior to each working stroke of said fastener driving means, said latter means comprising a housing block supported above the guide sleeve and reciprocable sleeve, said housing block having a perpendicular fastener passage to receive a succession of fasteners from the supply, a spring retracted detent bolt slidably mounted in said housing block to intersect said fastener passage, said detent bolt having a drop opening, a second spring retracted detent bolt slidably mounted in said housing block above said first mentioned detent bolt to also intersect said fastener passage, said second detent bolt having a fastener straddling fork at its forward end, a vertically movable cam plate slidable through said housing block, the tail portions of said detent bolts having slotted portions to receive said cam plate, upward movement of said cam plate being adapted to simultaneously advance said detent bolts, whereby to align the drop opening of the one with the fastener passage to thereby release a fastener for delivery to the chuck and to engage the fork of the other with a succeeding fastener for restraining downward movement thereof, said cam plate being engageable by said reciprocable sleeve whereby upward movement of the latter is transmitted to the former, and fastener guide means carried by said reciprocable sleeve to receive and deliver the released fastener to said chuck.

3. A power screw-driver having a motor actuated screw-driver member including normally released clutch means between the motor and said screw-driver member adapted to be closed when upward thrusting pressure is applied to the latter whereby to operatively rotate the same, a housing enclosing said clutch means, a guide sleeve dependent from said housing concentric to the axis of said screw-driver member, a fixed stop means adjacent to the upper end of said guide sleeve, a reciprocable sleeve slidable on said guide sleeve, a chuck carried by the lower end of said reciprocable sleeve to receive and hold a fastener in aligned opposition to said screw-driver member, stop means adjustably connected with the upper end of said reciprocable sleeve for cooperation with said fixed stop means, whereby to variably limit upward movement of said reciprocable sleeve and thus selectively predetermine the effective working stroke of the rotated screw-driver member, and means to deliver a screw from a supply thereof to said chuck prior to each working stroke of said screw-driver member comprising, a housing block supported above the guide sleeve and reciprocable sleeve, said housing block having a perpendicular screw passage to receive a succession of screws from the supply, a spring retracted detent bolt slidably mounted in said housing block to intersect said screw passage, said detent bolt having a drop opening, a second spring retracted detent bolt slidably mounted in said housing block above said first mentioned detent bolt to also intersect said fastener passage, said second detent bolt having a screw shank straddling fork at its forward end, a vertically movable cam plate slidable through said housing block to engage the tail portions of said detent blots, upward movement of said cam plate being adapted to simultaneously advance said detent bolts, whereby to align the drop opening of one with the screw passage to thereby release a screw for delivery to the chuck and to engage the fork of the other with a succeeding screw for restraining downward movement thereof, said cam plate being engageable by said reciprocable sleeve whereby upward movement of the latter is transmitted to the former, and screw guide means carried by said reciprocable sleeve to receive and deliver the released screw to said chuck.

4. In a tool of the class described, a fastener driving means and power actuated means for operating the same, means for housing said power actuated means, a guide means of reduced diameter dependent from said housing means concentric to the axis of said fastener driving means, whereby said housing means provides an external stop shoulder adjacent to the upper end of said guide means, a reciprocable means slidable on said guide means, a chuck carried by the lower end of said reciprocable means to receive and hold a fastener in aligned opposition to said driving means, and an axially adjustable external stop collar means mounted on the upper end of said reciprocable means for cooperation with said stop shoulder, whereby to variably limit upward movement of said reciprocable means and thus selectively predetermine the effective working stroke of said fastener driving means, and means to releasably retain said stop collar means against displacement from selected adjusted position.

5. In a tool of the class described, a fastener driving means and power actuated means for operating the same, means for housing said power actuated means, a guide means of reduced diameter dependent from said housing means concentric to the axis of said fastener driving means, whereby said housing means provides an external stop shoulder adjacent to the upper end of said guide means, a reciprocable means slidable on said guide means, a chuck carried by the lower end of said reciprocable means to receive and hold a fastener in aligned opposition to said driving means, and an axially adjustable external stop collar threaded on the upper end of said reciprocable means for cooperation with said stop shoulder, whereby to variably limit upward movement of said reciprocable means and thus selectively predetermine the effective working stroke of said fastener driving means, said collar being split to permit lateral expansion and contraction thereof, a discontinuous clamp ring around said collar having a clamp screw joining its meeting ends, whereby loosening of said clamp ring frees said collar for rotative adjusting movement, and tightening of said clamp ring constricts said collar to bind the same against displacement from selected adjusted position.

WILFRED A. BILLINGHURST.